United States Patent [19]
Fecht et al.

[11] Patent Number: 5,969,038
[45] Date of Patent: Oct. 19, 1999

[54] SALT STABLE CATIONIC SILICONE OIL-IN-WATER MICROEMULSION

[75] Inventors: Cassandre M. Fecht, Saginaw; Adam Lee Peterson, Midland; Janet Mary Smith, Bay City, all of Mich.; Adriana Urrutia Gutierrez, Westfield, N.J.; Jeffrey Alan Kosal, Midland, Mich.

[73] Assignee: Dow Corning Corporation, Midland, Mich.

[21] Appl. No.: 09/044,675

[22] Filed: Mar. 20, 1998

[51] Int. Cl.$^6$ ...................................... C08L 83/08
[52] U.S. Cl. ........................ 524/837; 524/838; 424/70.12
[58] Field of Search .................. 524/837, 838; 424/70.12

[56] References Cited

U.S. PATENT DOCUMENTS

| | | | |
|---|---|---|---|
| 2,891,920 | 6/1959 | Hyde | 260/29 |
| 3,294,725 | 12/1966 | Findlay | 260/29 |
| 4,733,677 | 3/1988 | Gee | 132/7 |
| 5,017,221 | 5/1991 | Legrow | 106/2 |
| 5,126,126 | 6/1992 | Varaprath et al. | 424/71 |
| 5,152,984 | 10/1992 | Varaprath et al. | 424/70 |
| 5,466,746 | 11/1995 | Geck | 524/837 |
| 5,504,149 | 4/1996 | Kosal | 524/837 |

FOREIGN PATENT DOCUMENTS

| | | |
|---|---|---|
| 459500 | 12/1991 | European Pat. Off. . |
| 463431 | 1/1992 | European Pat. Off. . |

OTHER PUBLICATIONS

Ullmann's Encyclopedia of Industrial Chemistry, vol. A9, p. 311, VCH, (1987).
Journal of Polymer Science, Part C, No. 27, pp. 27–34, (1969).

*Primary Examiner*—David W. Wu
*Assistant Examiner*—Caixia Lu-Rutt
*Attorney, Agent, or Firm*—James L. De Cesare

[57] ABSTRACT

A composition contains (A) a silicone component which is an aqueous oil-in-water microemulsion containing a polysiloxane stabilized in the microemulsion by a cationic surfactant, and (B) a inorganic salt or an organic salt. The polysiloxane in the cationic microemulsion has a particle diameter of less than about 100 nanometer, preferably less than about 40 nanometer. The polysiloxane is a polydimethylsiloxane or an amine functional polysiloxane, preferably prepared by emulsion polymerization. The composition preferably contains at least about twenty percent by weight of the salt.

12 Claims, No Drawings

SALT STABLE CATIONIC SILICONE OIL-IN-WATER MICROEMULSION

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This invention is directed to cationic oil-in-water microemulsions of polyorganosiloxanes which are stable in the presence of salts. More particularly, cationic oil-in-water microemulsions containing polydimethylsiloxanes and amine functional polysiloxanes do not break upon the addition of greater than twenty percent by weight of salts such as sodium chloride, calcium chloride, and ammonium chloride.

BACKGROUND OF THE INVENTION

Breaking is a term applied to the irreversible coalescence of the individual emulsion or microemulsion droplets to form a continuous phase. To break an emulsion or microemulsion, the stabilizing forces must be weakened or eliminated.

The addition of electrolytes, i.e., salts for example, often causes an emulsion or microemulsion to break, since the electric charge of a boundary layer is very sensitive to the addition of foreign ions. The effectiveness of the added electrolyte increases with its valence. Thus, aluminum sulfate or iron sulfate are more effective than sodium sulfate, and sodium sulfate is in turn more effective than sodium chloride, i.e., see *Ullmann's Encyclopedia of Industrial Chemistry*, Volume A9, Page 311, VCH, Weinheim, Germany (1987).

In view of the above, to provide a microemulsion that was stable in the presence of salts would be unexpected, and contrary to conventional wisdom.

The need and usefulness of such a microemulsion in textile applications, for example, is evidenced by U.S. Pat. No. 5,466,746 (Nov. 14, 1995), in which an alkyl polyglycoside, which is a nonionic surfactant, is used to prepare mechanical microemulsions possessing some degree of stability with respect to the presence of foreign electrolytes such as sodium chloride. This is not totally unexpected, however, as nonionic surfactants carry no charge.

What is unexpected, and what has been discovered according to the present invention, is that microemulsions stable to the presence of foreign electrolytes can be prepared using cationic surfactants, which contain positively charged polar groups, especially if the microemulsion is prepared using an emulsion polymerization technique, rather than prepared mechanically as in the '746 patent.

BRIEF SUMMARY OF THE INVENTION

This invention relates to cationic microemulsions that remain stable when incorporated with a variety of ionic inorganic and organic salts. Thus, cationic microemulsions with an average particle size of 140 nanometer (0.14 micrometer) or less, preferably 100 nanometer (0.10 micrometer) or less, and most preferably 40 nanometer (0.04 micrometer) or less, have been found to provide salt stability. Salt concentrations as high as thirty weight percent of the total solution can be incorporated into such stable systems; while lesser amounts can be easily tolerated, i.e., 0.1 to about thirty percent, preferably twenty to about thirty percent. In addition, increased solution clarity and reduced tackiness are added benefits provided by such salt stable cationic microemulsions. These microemulsions demonstrate long term system stability, i.e., upwards of six months, when stored at ambient temperatures.

These and other features and benefits of the invention will become apparent from a consideration of the detailed description.

BRIEF DESCRIPTION OF THE SEVERAL VIEWS OF THE DRAWING

Not applicable.

DETAILED DESCRIPTION OF THE INVENTION

As used herein, polysiloxane is intended to mean a polymer having the general structure:

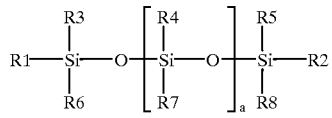

where a has a value to provide polymers with a viscosity in the range of about 1–30,000 centistoke (mm$^2$/sec). R1–R8 are alkyl radicals of 1–6 carbon atoms, or an aryl group such as phenyl. Typically, the value of a is about 1–1,250. Illustrative polysiloxanes are polydimethylsiloxane, polydiethylsiloxane, polymethylethylsiloxane, polymethylphenylsiloxane, and polydiphenylsiloxane. Preferred are polydimethylsiloxanes having a viscosity of 20–1,000 centistoke (mm$^2$/sec). Most preferred are polydimethylsiloxanes having a viscosity of 20–350 centistoke (mm$^2$/sec). By polydimethylsiloxane (PDMS), we mean a polysiloxane having the above structure where R4 and R7 are methyl radicals.

In addition to the aforementioned organic polysiloxanes, the present compositions may also include an amine functional polysiloxane. The amine functional polysiloxane is a silicone fluid with highly polar pendant aminoalkyl modifying groups that enhance the durability of films formed by the polysiloxane and promote adhesion of the films to various substrates.

Particularly preferred amine functional polysiloxanes include reactive and non-reactive hydrolyzable and non-hydrolyzable derivatives which are wholly, or in part, terminally substituted with aminopropyl, aminobutyl, or diamino pendant chains.

The amine functional polysiloxane employed in the microemulsions in accordance with the present invention has the formula:

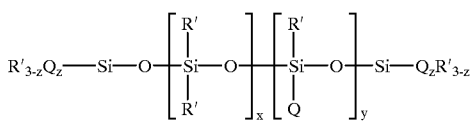

wherein R' denotes an alkyl group of 1 to 4 carbons or a phenyl group with the proviso that at least 50 percent of the total number of R' groups are methyl; Q denotes an amine functional substituent of the formula -R"Z wherein R" is a divalent alkylene radical of 3 to 6 carbon atoms and Z is a monovalent radical selected from the group consisting of —NR$_2$''', and —NR'''(CH$_2$)$_n$NR$_2$'''; wherein R''' denotes hydrogen or an alkyl group of 1 to 4 carbons, and n is a positive integer having a value of from 2 to 6; z has a value of 0 or 1; x has an average value of 25 to 3000; y has an average value of 0 to 100 when z is 1, y has an average value of 1 to 100 when z is 0; with the proviso that in all cases y has an average value that is not greater than one tenth the average value of x.

Suitable R' groups are represented by and may be independently selected from among methyl, ethyl, propyl, isopropyl, butyl, isobutyl, and phenyl, with the proviso that at least fifty percent of the R' groups are methyl.

The alkylene radicals represented by R" may include trimethylene, tetramethylene, pentamethylene, —CH$_2$CHCH$_3$CH$_2$—, and —CH$_2$CH$_2$CHCH$_3$CH$_2$—. Siloxanes where R" is a trimethylene or an alkyl substituted trimethylene radical such as —CH$_2$CHCH$_3$CH$_2$—, are preferred.

Alkyl groups of 1 to 4 carbon atoms as represented by R''' include methyl, ethyl, propyl, isopropyl, butyl, and isobutyl.

Useful Z radicals include the unsubstituted amine radical —NH$_2$, alkyl substituted amine radicals such as —NHCH$_3$, —NHCH$_2$CH$_2$CH$_2$CH$_3$, and —N(CH$_2$CH$_3$)$_2$; and aminoalkyl substituted amine radicals such as —NHCH$_2$CH$_2$NH$_2$, —NH(CH$_2$)$_6$NH$_2$, and —NHCH$_2$CH$_2$CH$_2$N(CH$_3$)$_2$.

When z is zero, the amine functional polysiloxane has only pendent amine substituents in the polymer chain. When z is one, the amine functional polysiloxane may have only terminal amine substituents or both terminal and pendent amine substituents in the polymer chain. Preferably, x may vary from a value of 25 to 100, and y may vary from zero to 100 when z is one and from one to 100 when z is zero. Most preferably, the value of x+y is in the range of about 50 to 500.

The composition according to the present invention includes as one of its components an aqueous microemulsion of either a polydimethylsiloxane or an amine functional polysiloxane stabilized in the microemulsion by one or more ionic surfactants. These microemulsions can be prepared mechanically or by emulsion polymerization.

Suitable mechanical microemulsions include compositions containing a polydimethylsiloxane or amine functional polysiloxane stabilized by a cationic surfactant. The siloxane is present in the microemulsion in the form of particles having a diameter less than about 140 nanometer (0.14 micrometer). Such microemulsions can be prepared by mechanical processes described in U.S. Pat. No. 5,017,221 (May 21, 1991) and EP 463 431 (Jan. 2, 1992), for example.

According to such processes, water, one or more ionic surfactants, and the siloxane, are simply mixed together, and homogenized using a laboratory homogenizer or other device for applying vigorous agitation. These mechanical microemulsions typically have a pH of 7–9.5, and contain 10–80 percent by weight of the siloxane, preferably 20–60 percent, 0.01–15 percent by weight of the ionic surfactant (s), the balance being water.

Emulsion polymerization can also be used to prepare suitable aqueous microemulsions containing polydimethylsiloxanes or amine functional polysiloxanes, stabilized in the microemulsions by an ionic surfactant. The siloxane is present in the microemulsion as particles having a diameter of less than 140 nanometer, preferably less than 40 nanometer. By way of comparison, fine emulsions contain a siloxane as particles with a diameter of 140–300 nanometer (0.14–0.30 micrometer). Standard emulsions, on the other hand, contain a siloxane as particles with a diameter greater than 300 nanometer (0.30 micrometer).

In any event, the microemulsion can be prepared by the emulsion polymerization process described in EP 459 500 (Dec. 4, 1992), for example. According to that process, stable, oil-free polysiloxane microemulsions are prepared by mixing a cyclic siloxane, an ionic surfactant, water, and a condensation polymerization catalyst. The mixture is heated and agitated at a polymerization reaction temperature until essentially all of the cyclic siloxane is reacted, and a stable, oil-free microemulsion is formed. The microemulsions typically have a pH of 6.5–8.0, and contain 10–70 percent by weight of the siloxane polymer, preferably 25–60 percent, 0.05–30 percent by weight of the ionic surfactant, preferably 0.5–20 percent, with the balance being water. The microemulsion can also be prepared by the emulsion polymerization process described in U.S. Pat. No. 2,891,920 (Jun. 23, 1959) or in U.S. Pat. No. 4,733,677 (Mar. 29, 1988).

The ionic surfactant according to the present invention can be any conventional cationic emulsifier used in emulsion polymerization. Such cationic surfactants include fatty acid amines, amides, and their salts. Suitable cationic surfactants are exemplified by aliphatic fatty amines and their derivatives such as dodecylamine acetate, octadecylamine acetate, and acetates of the amines of tallow fatty acids; homologues of aromatic amines having fatty chains such as dodecylaniline; fatty amides derived from aliphatic diamines such as undecyl imidazoline; fatty amides derived from di-substituted amines such as oleyl aminodiethylamine; derivatives of ethylene diamine; quaternary ammonium compounds such as tallow trimethyl ammonium chloride, dioctadecyl dimethyl ammonium chloride, didodecyl dimethyl ammonium chloride and dihexadecyl dimethyl ammonium chloride; amide derivatives of amino alcohols such as beta-hydroxyethyl stearylamide; amine salts of long chain fatty acids; quaternary ammonium bases derived from fatty amides of di-substituted diamines such as oleylbenzyl aminoethylene diethylamine hydrochloride; quaternary ammonium bases of benzimidazolines such as methylheptadecyl benzimidazol hydrobromide; basic compounds of pyridinium and its derivatives such as cetyl pyridinium chloride; sulfonium compounds such as octadecyl sulfonium methyl sulfate; quaternary ammonium compounds of betaine such as betaine compounds of diethylamino acetic acid and octadecyl chloromethyl ether; urethanes of ethylene diamine such as condensation products of stearic acid and diethylene triamine; polyethylene diamines; and polypropanol polyethanol amines.

Examples of commercial cationic surfactants are those products sold under the tradenames ARQUAD T-27 W, ARQUAD 16-29 W, ARQUAD C-33 W, ARQUAD T-50, and ETHOQUAD T-13-27 W ACETATE by Akzo Chemicals, Inc., Chicago, Ill.

Any catalyst that is capable of polymerizing cyclic siloxanes in the presence of water is useful in the preparation of the microemulsion. Catalysts include condensation polymerization catalysts capable of cleaving siloxane bonds. Some examples of condensation polymerization catalysts are strong acids such as substituted benzene sulfonic acids, aliphatic sulfonic acids, hydrochloric acid, and sulfuric acid; and strong bases such as quaternary ammonium hydroxides and metal hydroxides. Ionic surfactants such as dodecylbenzene sulfonic acid, i.e., BIOSOFT S-100, can additionally function as catalyst. Other useful catalytic systems include phase transfer catalysts such as tetrabutyl ammonium hydroxide, or ion exchange resins where a catalyst is formed in situ.

The reaction can be stopped by neutralization of the catalyst by the addition of an equal or slightly greater stoichiometric amount of an acid or a base, depending upon the type of catalyst used in the reaction. A strong or weak acid or base may be used, however, care must be taken when using a strong acid or base not to over neutralize, as it may be possible to re-catalyze the reaction. It is preferred to neutralize with a sufficient quantity of an acid or a base such that the resulting emulsion has a pH of less than 7.

As used herein, the term salt is intended to mean an inorganic salt or an organic salt, including compounds commonly referred to as electrolytes.

Some examples of suitable inorganic salts include calcium chloride, magnesium sulfate, magnesium chloride, sodium sulfate, sodium thiosulfate, sodium chloride, sodium phosphate, ammonium chloride, ammonium carbonate, iron sulfate, aluminum sulfate, aluminum chloride, aluminum chlorohydrate, aluminum sesquichlorohydrate, aluminum dichlorohydrate, aluminum zirconium tetrachorohydrex glycine, aluminum zirconium trichlorohydrate, aluminum zirconium tetrachlorohydrate, aluminum zirconium pentachlorohydrate, and aluminum zirconium octachlorohydrate.

Some examples of suitable organic salts include sodium aluminum lactate, sodium acetate, sodium dehydroacetate, sodium butoxy ethoxy acetate, sodium caprylate, sodium citrate, sodium lactate, sodium dihydroxy glycinate, sodium gluconate, sodium glutamate, sodium hydroxymethane sulfonate, sodium oxalate, sodium phenate, sodium propionate, sodium saccharin, sodium salicylate, sodium sarcosinate, sodium toluene sulfonate, magnesium aspartate, calcium propionate, calcium saccharin, calcium d-saccharate, calcium thioglycolate, aluminum caprylate, aluminum citrate, aluminum diacetate, aluminum glycinate, aluminum lactate, aluminum methionate, aluminum phenosulfonate, potassium aspartate, potassium biphthalate, potassium bitartrate, potassium glycosulfate, potassium sorbate, potassium thioglycolate, potassium toluene sulfonate, and magnesium lactate.

The microemulsion should contain a small amount of a preservative, generally in an amount of about 10 to 1,000 ppm, in order to prevent microbial contamination and multiplication. Some representative examples are compounds such as formaldehyde; 1,3-dimethylol-5,5-dimethyl (DMDM) hydantoin; 5-bromo-5-nitro-1,3-dioxane; methyl paraben (methyl para-hydroxy benzoate); propyl paraben (propyl para-hydroxy benzoate); sorbic acid; imidazolidinyl urea; 5-chloro-2-methyl-4-isothiazolin-3-one, a product sold under the trademark KATHON® LX by the Rohm and Haas Company, Philadelphia, Pa.; Quaternium-15 (chloroallyl methenamine chloride); and a mixture of diazolidinyl urea and parabens sold under the trademark GERMABEN® II-E by Sutton Laboratories, Chatham, N.J.

EXAMPLES

In order to determine stability limits, several salts and microemulsions types were included in the following test protocols. The salts that were used included a 50 percent by weight aqueous solution of aluminum chlorohydrate (ACH-303); powdered aluminum chlorohydrate (ACH-323 Powder); a 35 percent by weight aqueous solution of aluminum zirconium tetrachlorohydrex glycine (AZG-368); powdered aluminum zirconium tetrachlorohydrex glycine (AZG-370 Powder); a 50 percent by weight aqueous solution of aluminum zirconium tetrachlorohydrex glycine (AZG-370); sodium chloride; calcium chloride; and ammonium chloride.

Aluminum zirconium tetrachlorohydrex glycine, it is noted, is a coordination complex of aluminum zirconium tetrachlorohydrate $Al_4Zr(OH)_{12}Cl_4 \cdot nH_2O$ and the amino acid glycine $H_2NCH_2COOH$, in which some of the water molecules normally coordinated to the metal have been displaced by the glycine.

Anionic, nonionic, and cationic emulsions and microemulsions were selected for the test protocols. Emulsions and microemulsions with particle size characteristics of the polysiloxane ranging from less than about 40 nanometer (nm) to approximately 450 nanometer (nm) were considered in the course of the tests.

As used herein, the term microemulsion is intended to include compositions in which a siloxane is present as particles having an average particle diameter of less than about 140 nanometer. The term emulsion is intended to include compositions in which a siloxane is present as particles having an average particle diameter of more than about 140 nanometer.

The internal phase, i.e., the polysiloxane, viscosity for the eleven (11) emulsions and microemulsions considered ranged from 2000 centipoise (cP)/mPa•s to 1,000,000 cP/mPa•s. Table I shows each of these emulsions and microemulsions and their physical properties. Table I identifies the type of polysiloxane in each emulsion/microemulsion as PDMS for those containing a polydimethylsiloxane polymer, and as AMINO for those containing an amine functional polysiloxane polymer.

TABLE I

Emulsions/Microemulsions Tested for Salt Stability

| Silicone Emulsion or Microemulsion | Surfactant Type | Polymer Viscosity centipoise | Particle Size nanometer | pH | Percent Silicone | Salt Stability |
|---|---|---|---|---|---|---|
| Microemulsion 1000 | Cationic | 15,000 PDMS | 42–72 | 5–6.5 | 30 | Stable |
| Microemulsion 1100 | Cationic | 3,000 AMINO | <40 | 7.5 to 8.5 | 29 | Stable |
| Microemulsion 1200 | Cationic | 80,000 AMINO | ~33 | 6.5–8 | 25 | Stable |
| Microemulsion 1300 | Cationic | 3,000 AMINO | ~26 | 6.5–8 | 25 | Stable |
| Emulsion 1400 | Cationic | 2,000 AMINO | 120–150 | 6.5–9 | 36 | Unstable |
| Emulsion 1500 | Cationic | 1,000,000 PDMS | 100–170 | 5–7 | 36 | Unstable |
| Microemulsion 1600 | Anionic | >15,000 PDMS | <40 | 6.5–8 | 25 | Unstable |
| Microemulsion 1700 | Anionic | 60,000 to 600,000 PDMS | 45–50 | 6.5–8 | 25 | Unstable |

TABLE I-continued

Emulsions/Microemulsions Tested for Salt Stability

| Silicone Emulsion or Microemulsion | Surfactant Type | Polymer Viscosity centipoise | Particle Size nanometer | pH | Percent Silicone | Salt Stability |
|---|---|---|---|---|---|---|
| Microemulsion 1800 | Anionic | 4,500 to 7,000 PDMS | <40 | 6.5–8 | 25 | Unstable |
| Emulsion 1900 | Anionic | 1,000,000–1,500,000 PDMS | <1,000 | 6–8 | 50 | Unstable |
| Emulsion 2000 | Nonionic | 110–180 AMINO | >300 | 9–11.5 | 36 | Unstable |

Silicone 1000 was a cationic microemulsion prepared by emulsion polymerization. Silicone cationic microemulsion 1000 contained as the cationic surfactant ETHOQUAD T-13-27 W, a tallow alkyltris (2-hydroxyethyl) ammonium acetate.

Silicone 1100 was a cationic microemulsion prepared by emulsion polymerization. Silicone cationic microemulsion 1100 contained as the cationic surfactant ARQUAD 16-29 W, i.e., hexadecyl (cetyl) trimethyl ammonium chloride.

Silicone 1200 was a cationic microemulsion prepared by emulsion polymerization. Silicone cationic microemulsion 1200 contained as the cationic surfactant ARQUAD 16-29 W.

Silicone 1300 was a cationic microemulsion prepared by emulsion polymerization. Silicone cationic microemulsion 1300 contained as the cationic surfactant ARQUAD 16-29 W.

Silicone 1400 was a cationic emulsion prepared by emulsion polymerization. Silicone cationic emulsion 1400 contained as the cationic surfactant ARQUAD 16-29 W.

Silicone 1500 was a cationic emulsion prepared by emulsion polymerization. Silicone cationic emulsion 1500 contained as the cationic surfactant ARQUAD T-27 W, a tallow trimethyl ammonium chloride.

Silicone 1600 was an anionic microemulsion prepared by emulsion polymerization. Silicone anionic microemulsion 1600 contained as the anionic surfactant dodecylbenzene sulfonic acid (DBSA) sold under the tradename BIOSOFT S-100 by the Stepan Company, Northfield, Ill.

Silicone 1700 was an anionic microemulsion prepared by emulsion polymerization. Silicone anionic microemulsion 1700 contained as the anionic surfactant DBSA.

Silicone 1800 was an anionic microemulsion prepared by emulsion polymerization. Silicone anionic microemulsion 1800 contained as the anionic surfactant DBSA.

Silicone 1900 was an anionic emulsion prepared by emulsion polymerization. Silicone anionic emulsion 1900 contained as the anionic surfactant DBSA.

Silicone 2000 was a nonionic emulsion prepared mechanically. Silicone nonionic emulsion 2000 contained as nonionic surfactants TERGITOL® TMN-6, i.e., ethoxylated trimethylnonanol, and TRITON® X-405, i.e., octylphenoxy polyethoxy ethanol; each a trademark and product of Union Carbide Corporation, Danbury, Conn.

Silicone Emulsions and Microemulsions 1000 to 1900 can be prepared generally according to the method described in EP 459 500, as noted above, in which a cyclic siloxane, ionic surfactant, water, and catalyst, are mixed, heated, and agitated.

Silicone Cationic Emulsions and Microemulsions 1000 to 1500 can also be prepared generally according to the method described in U.S. Pat. No. 2,891,920, as noted above.

Silicone Anionic Emulsions and Microemulsions 1600 to 1900 can also be prepared generally according to the method described in U.S. Pat. No. 3,294,725 (Dec. 27, 1966); or generally according to the method described in the Journal of Polymer Science, Part C, entitled "Anionic Emulsion Polymerization of Siloxanes", Pages 27–34, (1969).

Silicone Mechanical Emulsion 2000 can be prepared generally according to the method described in U.S. Pat. No. 5,017,221 and EP 463 431, as noted above, in which a functional or non-functional polysiloxane, surfactant, and water, are mixed and emulsified using a high shear device.

Example I

Solutions

Solutions were prepared containing a salt and one of the eleven emulsions or microemulsions shown in Table I. These solutions were monitored for stability after aging under ambient temperatures, i.e., at 20 to 25° C., and at 40° C. The solutions were also subjected to freeze/thaw cycles to challenge their stability. In addition, the solutions containing the emulsions and microemulsions were monitored for changes in clarity using a Bausch & Lomb Spectronic 21 Spectrophotometer. The results are shown below in Tables II–VII.

Example II

Anionic Microemulsions

In this example, it was determined that all of the anionic emulsions and microemulsions shown in Table I were not salt stable. Thus, when salts were added to anionic emulsions and microemulsions seen in Table I, strong signs of instability were observed, i.e., thickening and separation. As an example, several solutions were prepared using several different salts and one of the anionic microemulsions, and the results provide evidence of the instability which results from a combination of an anionic emulsion or microemulsion and a salt. Such results are shown in Table II.

TABLE II

Examples of Anionic Microemulsion Instability

| Microemulsion | Salt | Wt % Salt Powder Solution | Initial Observation | Observation after 24 Hours |
|---|---|---|---|---|
| 1800 | ACH-323 Powder | 20 | Hard to mix solid/opaque | Opaque/Thick |
| 1800 | AZG-370 Powder | 20 | Hard to mix solid/opague | Opaque/Thick |
| 1800 | Calcium Chloride | 20 | Exotherm/Opaque | Opaque/Thick |
| 1800 | Sodium Chloride | 20 | Opaque/Thick | Opaque/Thick Separated |
| 1800 | Ammonium Chloride | 20 | Endotherm Opaque | Opaque |

Example III

Nonionic Emulsion

In this example, a nonionic emulsion containing an amine functional polysiloxane was tested and found to be unstable when combined with several different types of salts. The results are shown in Table III.

TABLE III

Non-ionic Emulsion Instability

| Emulsion | Salt | Wt Percent Salt/Powder Solution | Initial Observation | Observation after 24 Hours |
|---|---|---|---|---|
| 2000 | Sodium Chloride | 20 | No Change | Phases Separated |
| 2000 | ACH-323 Powder | 20 | Thick | Slight ring on top/thick |
| 2000 | AZG-370 Powder | 20 | Thick | Phases Separated |

Example IV

Cationic Microemulsions

In this example, cationic microemulsions of varying particle size and internal phase viscosity as shown in Table I were tested. Thus, three cationic microemulsions containing an amine functional polysiloxane with a particle size of less than 40 nanometer were found to be stable upon salt addition. However, a cationic microemulsion containing an amine functional polysiloxane with a particle size greater than 120 nanometer was found to be unstable upon addition of the salt. A cationic microemulsion containing a polydimethylsiloxane with a particle size less than 40 nanometer was found to be stable upon addition of the salt. However, a cationic microemulsion containing a polydimethylsiloxane with a particle size greater than 100 nanometer was found to be unstable upon addition of the salt. Differences in internal phase viscosity did not appear to negatively or positively affect the stability results for the cationic microemulsions containing an amine functional polysiloxane, however it did impact stability results for the two cationic microemulsions containing polydimethylsiloxanes as can be seen in Table I.

An improvement in clarity was noted for several of the salt containing solutions that were tested. In general, stability was achieved with a salt content as high as 30 percent by weight of the salt, as can be seen in Tables IV–VII which show results obtained with one particular cationic microemulsion containing an amine functional polysiloxane, which was examined using various salts in various concentrations in several solutions.

TABLE IV

Salt Stable Microemulsion

| Wt % 1300 % T = 96.5 | % Si | Wt % AZG-370 | Wt % Water & Total Water | Observation | % T | Ambient Stability (24 Hours) | Ambient Stability (6 Months) |
|---|---|---|---|---|---|---|---|
| 40 | 10 | 20 | 40/62.8 | Clear | 98 | stable | stable |
| 40 | 10 | 25 | 35/57.8 | Clear | 98.5 | stable | stable |
| 40 | 10 | 30 | 30/52.8 | Clear | 98 | stable | stable |
| 40 | 10 | 35 | 25/47.8 | Clear | 99 | stable | separated |
| 40 | 10 | 40 | 20/42.8 | Hard to mix | 96.5 | stable | thick |
| 40 | 10 | 45 | 15/37.8 | Hard to mix cloudy | 67 | viscous | cloudy thick |
| 40 | 10 | 50 | 10/32.8 | Hard to mix cloudy | 3 | viscous | cloudy thick |
| 50 | 13 | 20 | 30/58.5 | Clear | 97 | stable | stable |
| 80 | 20 | 20 | 0/45.6 | Clear | 99 | stable | stable thick |

TABLE V

Salt Stable Microemulsion

| Wt % 1300 % T = 96.5 | % Si | Wt % Sodium Chloride | Wt % Water & Total Water | Observation | % T | Ambient Stability (24 Hours) | Ambient Stability (6 Months) |
|---|---|---|---|---|---|---|---|
| 40 | 10 | 20 | 40/62.8 | Clear | 94 | stable | stable |
| 40 | 10 | 25 | 35/57.8 | Salt hard to dissolve | 96 | stable | separated |

TABLE VI

Salt Stable Microemulsion

| Wt % 1300 % T = 96.5 | % Si | Wt % Calcium Chloride | Wt % Water & Total Water | Observation | % T | Ambient Stability (24 Hours) | Ambient Stability (6 Months) |
|---|---|---|---|---|---|---|---|
| 40 | 10 | 20 | 40/62.8 | Clear | 99 | stable | stable |
| 40 | 10 | 25 | 35/57.8 | Clear | 100 | stable | stable |
| 40 | 10 | 30 | 30/52.8 | Clear | 98 | stable | separated |

TABLE VII

Salt Stable Microemulsion

| Wt % 1300 % T = 96.5 | % Si | Wt % Ammonium Chloride | Wt % Water & Total Water | Observation | % T | Ambient Stability (24 Hours) | Ambient Stability (6 Months) |
|---|---|---|---|---|---|---|---|
| 40 | 10 | 20 | 40/62.8 | Clear | 98 | stable | stable |
| 40 | 10 | 25 | 35/57.8 | Salt hard to dissolve | 98.5 | stable | separated |

Salt stable cationic microemulsions according to this invention are useful generally in textile applications, and in personal care products, where the presence and tolerance of large amounts of one or more salts is beneficial.

Other variations may be made in compounds, compositions, and methods described herein without departing from the essential features of the invention. The embodiments of the invention specifically illustrated herein are exemplary only and not intended as limitations on their scope except as defined in the appended claims.

We claim:

1. A composition comprising a stable mixture of
   (A) a silicone component which is an aqueous oil-in-water microemulsion containing a polysiloxane stabilized in the microemulsion by a cationic surfactant, the polysiloxane in the microemulsion having a particle diameter of less than about 100 nanometer; and
   (B) a salt selected from the group consisting of aluminum sulfate, aluminum chloride, aluminum chlorohydrate, aluminum sesquichlorohydrate, aluminum dichlorohydrate, aluminum zirconium tetrachorohydrex glycine, aluminum zirconium trichlorohydrate, aluminum zirconium tetrachlorohydrate, aluminum zirconium pentachlorohydrate, and aluminum zirconium octachlorohydrate.

2. A composition according to claim 1 in which the silicone component is an aqueous oil-in-water microemulsion containing an emulsion polymerized polysiloxane stabilized in the microemulsion by a cationic surfactant, the polysiloxane in the microemulsion having a particle diameter less than about 100 nanometer.

3. A composition according to claim 1 in which the silicone component is an aqueous oil-in-water microemulsion containing an emulsion polymerized polydimethylsiloxane stabilized in the microemulsion by a cationic surfactant, the polysiloxane in the microemulsion having a particle diameter less than about 100 nanometer.

4. A composition according to claim 1 in which the silicone component is an aqueous oil-in-water microemulsion containing an emulsion polymerized amine functional polysiloxane stabilized in the microemulsion by a cationic surfactant, the polysiloxane in the microemulsion having a particle diameter less than about 100 nanometer.

5. A composition according to claim 1 in which the composition contains 0.1 to about thirty percent by weight of the salt, based on the total weight of the composition, the remainder of the composition being the microemulsion; the microemulsion containing 10 to 80 percent by weight of the polysiloxane, 0.05 to 30 percent by weight of the cationic surfactant, with the balance being water, based on the total weight of the microemulsion.

6. A composition according to claim 5 in which the composition contains at least about twenty percent by weight of the salt, based on the total weight of the composition, the remainder of the composition being the microemulsion; the microemulsion containing 10 to 80 percent by weight of the polysiloxane, 0.05 to 30 percent by weight of the cationic surfactant, with the balance being water, based on the total weight of the microemulsion.

7. A composition according to claim 6 in which the composition contains about thirty percent by weight of the salt based on the total weight of the composition, the remainder of the composition being the microemulsion; the microemulsion containing 10 to 80 percent by weight of the polysiloxane, 0.05 to 30 percent by weight of the cationic surfactant, with the balance being water, based on the total weight of the microemulsion.

8. A composition according to claim 1 in which the polysiloxane in the microemulsion has a particle diameter less than about 40 nanometer.

9. A composition according to claim 8 in which the polysiloxane in the microemulsion has a viscosity of from about 3,000 to about 80,000 centipoise (mPa•s).

10. A composition according to claim 1 in which the polysiloxane in the microemulsion has the formula

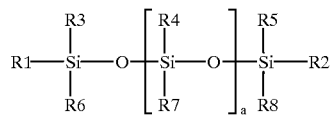

where a has a value of 1–1,250, and R1 to R8 are alkyl radicals of 1–6 carbon atoms or an aryl group.

11. A composition according to claim 1 in which the polysiloxane in the microemulsion has the formula

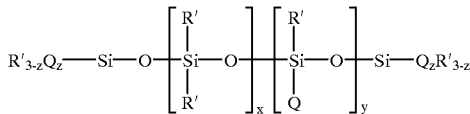

wherein R' denotes an alkyl group of 1 to 4 carbons or a phenyl group with the proviso that at least 50 percent of the total number of R' groups are methyl; Q denotes an amine functional substituent of the formula -R"Z wherein R" is a divalent alkylene radical of 3 to 6 carbon atoms and Z is a monovalent radical selected from the group consisting of —$NR_2'''$, and —$NR'''(CH_2)_nNR_2'''$; wherein R''' denotes hydrogen or an alkyl group of 1 to 4 carbons, and n is a positive integer having a value of from 2 to 6; z has a value of 0 or 1; x has an average value of 25 to 3000; y has an average value of 0 to 100 when z is 1, y has an average value of 1 to 100 when z is 0; with the proviso that in all cases y has an average value that is not greater than one tenth the average value of x.

12. A composition comprising a stable mixture of (A) a silicone component which is an aqueous oil-in-water microemulsion containing a polysiloxane stabilized in the microemulsion by a cationic surfactant, the polysiloxane in the microemulsion having a particle diameter of less than about 100 nanometer; and (B) a salt selected from the group consisting of sodium aluminum lactate, sodium butoxyethoxy acetate, sodium caprylate, sodium citrate, sodium dihydroxy glycinate, sodium gluconate, sodium glutamate, sodium hydroxymethane sulfonate, sodium oxalate, sodium phenate, sodium propionate, sodium saccharin, sodium salicylate, sodium sarcosinate, sodium toluene sulfonate, magnesium aspartate, calcium propionate, calcium saccharin, calcium d-saccharate, calcium thioglycolate, aluminum caprylate, aluminum citrate, aluminum diacetate, aluminum glycinate, aluminum lactate, aluminum methionate, aluminum phenosulfonate, potassium aspartate, potassium biphthalate, potassium bitartrate, potassium glycosulfate, potassium sorbate, potassium thioglycolate, potassium toluene sulfonate, and magnesium lactate.

* * * * *